United States Patent
Tseng

(10) Patent No.: US 7,383,526 B2
(45) Date of Patent: Jun. 3, 2008

(54) COST-OPTIMIZATION METHOD

(75) Inventor: Chin-Tien Tseng, Taipei (TW)

(73) Assignee: Inventec Corporation (TW)

( * ) Notice: Subject to any disclaimer, the term of this patent is extended or adjusted under 35 U.S.C. 154(b) by 174 days.

(21) Appl. No.: 11/089,078

(22) Filed: Mar. 23, 2005

(65) Prior Publication Data

US 2006/0236286 A1    Oct. 19, 2006

(51) Int. Cl.
G06F 17/50 (2006.01)
G06F 19/00 (2006.01)
G06F 17/00 (2006.01)
G06G 7/00 (2006.01)

(52) U.S. Cl. ............................ 716/11; 716/2; 705/400; 700/107

(58) Field of Classification Search ............... 716/2, 716/11; 705/400; 700/107
See application file for complete search history.

(56) References Cited

U.S. PATENT DOCUMENTS

| | | | | |
|---|---|---|---|---|
| 6,086,631 A * | 7/2000 | Chaudhary et al. | ............ | 716/16 |
| 6,530,073 B2 * | 3/2003 | Morgan | ............ | 716/18 |
| 6,578,174 B2 * | 6/2003 | Zizzo | ............ | 716/1 |
| 6,594,799 B1 * | 7/2003 | Robertson et al. | ............ | 716/1 |
| 6,931,617 B2 * | 8/2005 | Sanie et al. | ............ | 716/18 |
| 7,093,210 B2 * | 8/2006 | Maehara et al. | ............ | 716/4 |
| 7,099,724 B2 * | 8/2006 | Satake et al. | ............ | 700/90 |
| 2004/0044429 A1 * | 3/2004 | Takeda et al. | ............ | 700/97 |
| 2004/0098391 A1 * | 5/2004 | Robertson et al. | ............ | 707/10 |
| 2005/0183055 A1 * | 8/2005 | Herrera | ............ | 716/17 |

* cited by examiner

*Primary Examiner*—Jack Chiang
*Assistant Examiner*—Magid Y. Dimyan
(74) *Attorney, Agent, or Firm*—Peter F. Corless; Steven M. Jensen; Edwards Angell Palmer & Dodge LLP

(57) ABSTRACT

A method of controlling an optimal cost is proposed, which can be applied to a circuitry designing process for making electronic products, allowing a user in drawing a circuitry to choose elements of identical specification with different unit prices, thereby achieving the objective of cost-optimization. The cost-optimization method comprises the steps of: first, integrating data of each of the elements of identical specification at different unit prices to form an element database; then, choosing each of the required elements for drawing the circuitry according to the data stored in the element database. The method provides an element database capable of storing and displaying electronic elements of identical specification with different unit prices for the users' selection, thereby achieving a primary objective of effectively controlling an optimal cost in circuitry designing.

15 Claims, 6 Drawing Sheets

| Name | Packaging | Property | Factory Material | Specification |
|---|---|---|---|---|
|  |  |  |  |  |
|  |  |  |  |  |
| ⋮ | ⋮ | ⋮ | ⋮ | ⋮ |

| Name of Element | Mode of Packaging | Property of Element | Factory material serial number | Specification of Element | Source of incoming materials | Unit Price |
|---|---|---|---|---|---|---|
|  |  |  |  |  |  |  |
|  |  |  |  |  |  |  |
| ⋮ | ⋮ | ⋮ | ⋮ | ⋮ | ⋮ | ⋮ |

| Material Serial Number of Factory | Mode of Packaging | Quantity | Unit Price | Quantity Cost | Total Quantity | Total Cost |
|---|---|---|---|---|---|---|
| | | | | | | |
| ⋮ | ⋮ | ⋮ | ⋮ | ⋮ | | |

COST-OPTIMIZATION METHOD

FIELD OF THE INVENTION

The present invention relates to methods of controlling costs, and more particularly, to a method of controlling costs applied to a circuitry designing stage for making electronic products.

BACKGROUND OF THE INVENTION

Typically, an entire production process of general electronic products involves several different stages starting from circuitry designing, configuration, error-elimination, testing, and test-production to mass production. During the process of developing each stage, the cost control greatly influences the profit and value of the fabricated products. In a highly competitive market nowadays, besides providing high-quality and multi-functional products to meet the consumers' demands, how to effectively increase the gross profit is also imperative. Since circuitry designing is the primary and the most significant stage in a production process, the cost control of each electronic element chosen and used in a circuitry becomes crucial. Generally, the process of a latter stage in circuitry designing is depicted with reference to the accompanying drawings.

Illustrated in FIGS. 1(A) and 1(B) are a complete circuitry and the corresponding form thereof. As shown in FIG. 1(A), an engineer uses a drawing software to draw and complete the circuitry, the drawing software further provides a selecting function for the engineer to select a number of elements for composing the circuitry via a material-selection form (linked to an element database through the drawing software) displayed on a screen as shown in FIG. 1(B). Thereafter, the engineer chooses necessary and appropriate elements for completing circuitry designing from the given columns on the material-selection form that includes element packaging, properties, factory materials, and specifications, thereby conducting subsequent processes of production accordingly. Then, an internal accounting department calculates the total cost of the elements used for the circuitry based on the unit price of each electronic element chosen by the engineer.

As seen from the above, there is no cost control mechanism used in the foregoing circuitry designing stage. The entire process is simply conducted by an engineer selecting the electronic elements as required according to the information given on the columns of a material selection form, and an accounting department calculating the total cost according to the pricing data of each of the elements chosen by the engineer. In the process, an engineer only chooses the specifications for required elements and is unable to assist in controlling the costs, resulting low product profit and weak competition in the market as a result.

Therefore, how to effectively control the cost of each of the elements used in a circuitry designing stage of a production process to thereby increase product profits and market competition, is a critical issue to solve.

SUMMARY OF THE INVENTION

A primary objective of the present invention is to provide a method for controlling an optimal cost, which can be applied to a circuitry designing process for making electronic products, thereby saving the cost and increasing the profit as a result.

Another objective of the present invention is to provide a method of controlling an optimal cost, which can be applied to a circuitry designing process for making electronic products, thereby enhancing the market competition ability.

According to the above and other objectives, the present invention proposes a cost-optimization method, the method comprising the steps of: integrating data of elements of identical specification but with different unit prices to form an element database; and, choosing each of the required elements for drawing a circuitry according to the data stored in the element database.

Compared to the circuitry designing used in the prior art, the cost-optimization method of the present invention is beneficial to implement in that the method provides an element database capable of storing and displaying electronic elements of identical specification but with different unit prices, allowing the users to select appropriate elements as required, so that a primary objective of effectively controlling an optimal cost can be achieved.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENT

Figures 1A, 1B:
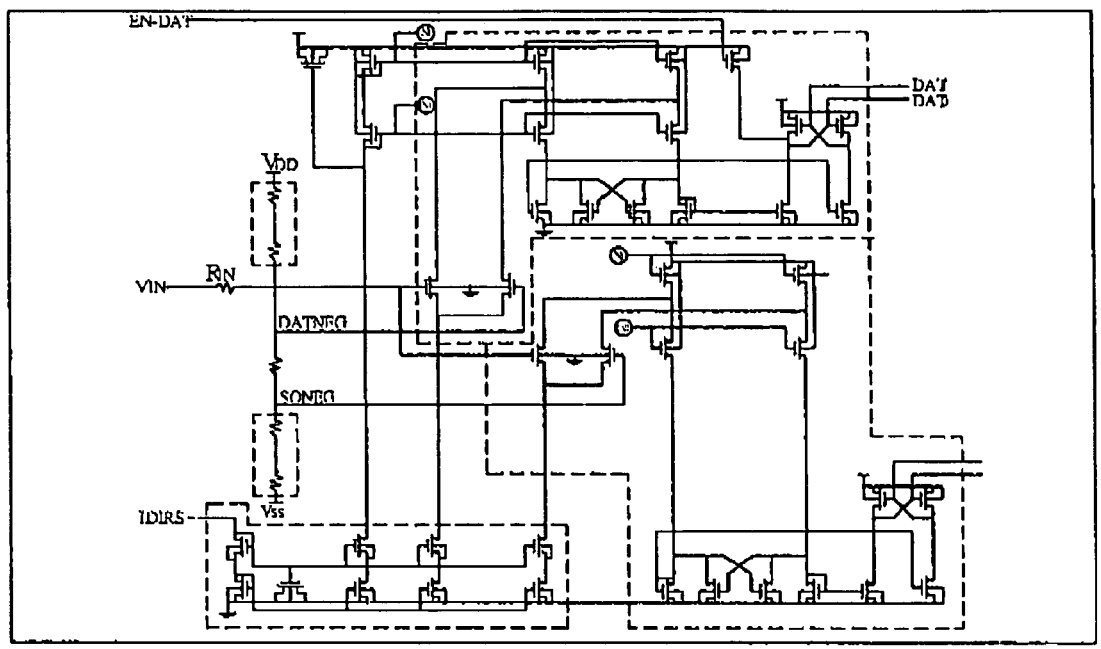
FIG. 1A (PRIOR ART) is a schematic diagram showing a circuitry drawn in a circuitry designing stage for making electronic products.
FIG. 1B (PRIOR ART) is a schematic diagram showing a material-selection form corresponding to the finished circuitry in a designing stage for making electronic products.
Figure 2:
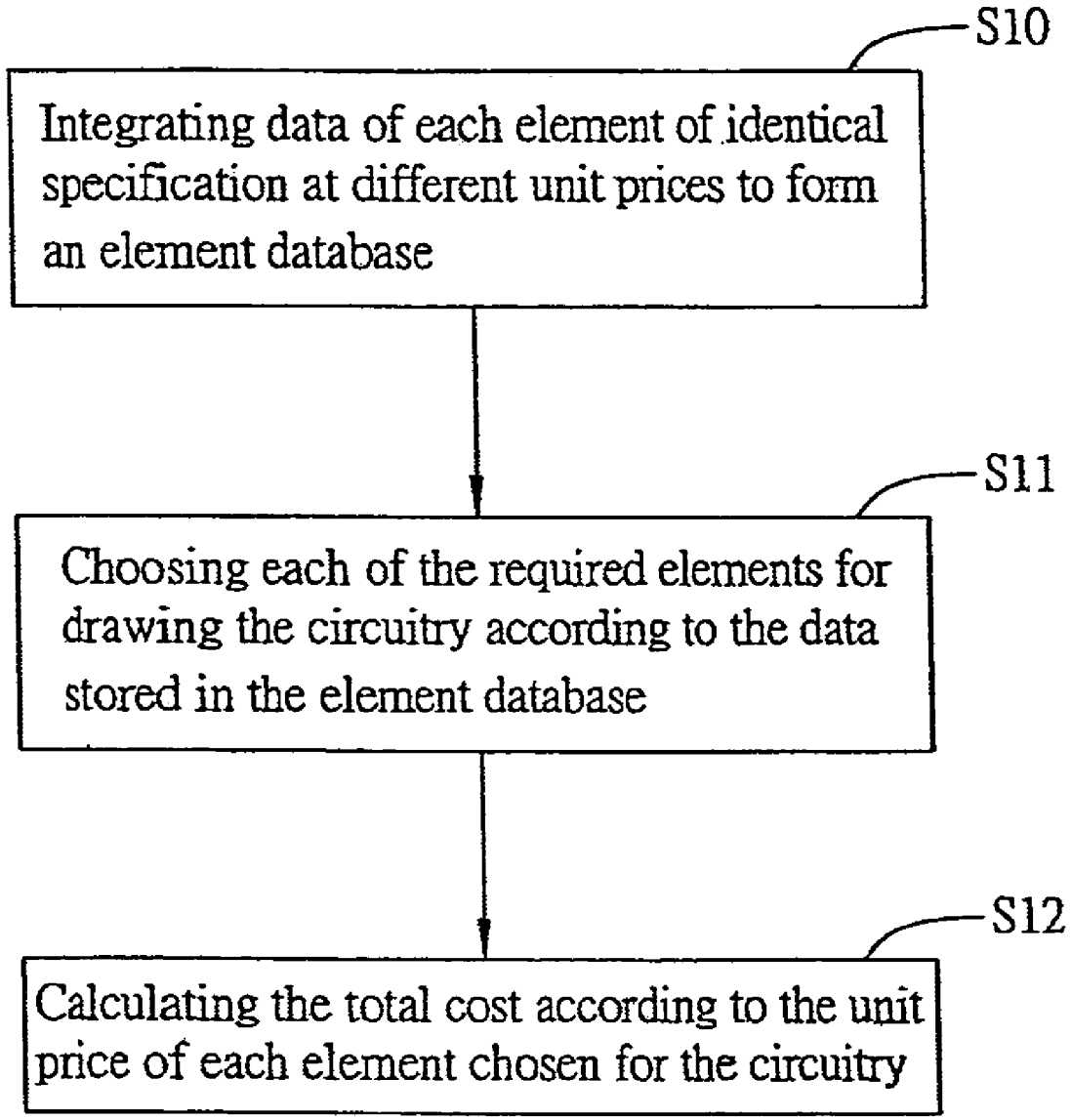
FIG. 2 is a schematic flow diagram showing the major steps for proceeding a cost-optimization method of the invention.

FIG. 2 illustrates the major steps involved in proceeding the cost-optimization method of the invention. It is to be noted that, the schematic drawings are simplified to depict only the basic steps involved in proceeding the method of the invention, therefore the drawings only depict words that are related to the invention for brevity.

As shown in the drawing, the cost optimization method of the invention is applied to a circuitry designing stage for making electronic products, allowing a user in drawing a circuitry to choose elements of identical specification but with different unit prices, thereby achieving the objective of an optimal cost.

First, a step S10 is implemented to integrate data of each of the electronic elements of identical specification but different unit prices to form an element database. This is implemented by first categorizing each of the electronic elements to sort out elements of identical specification with different unit prices so as to form an element database for proceeding the subsequent steps. Thereafter, a step S11 is proceeded.

Figures 3A, 3B:
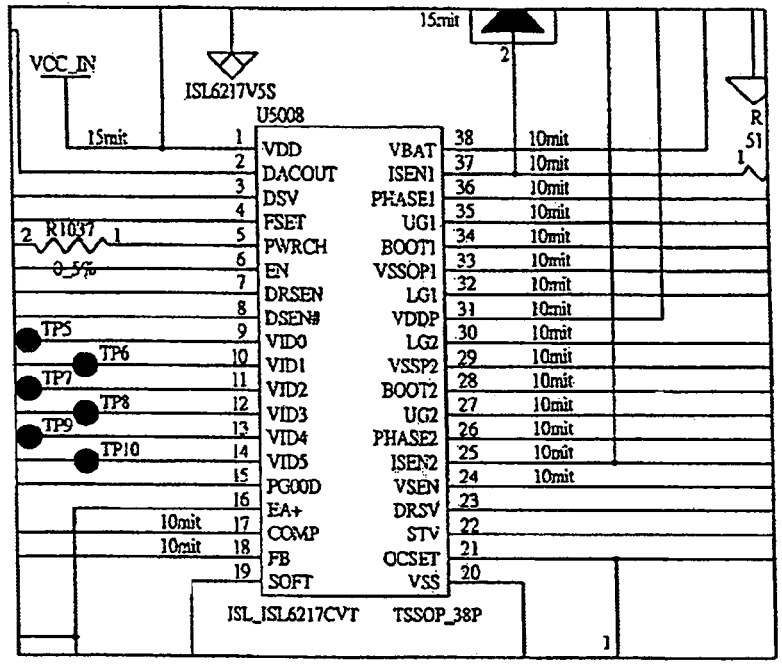
FIG. 3A is a schematic diagram showing an electronic element applied to a circuitry designing for the cost-optimization method of the invention.
FIG. 3B is a schematic diagram showing a material-selection form corresponds to the element applied to the circuitry designing for the cost-optimization method of the invention.

In step S11, each of the required elements is chosen for composing a circuitry according to the element database, wherein a user chooses a most suitable element according to the data displayed from the database for completing the circuitry designing process, as shown in. FIG. 3(A), which exemplifies an element chosen for a circuitry, wherein a user chooses the required elements for drawing a circuitry by using a drawing software that is prompted to link to the foregoing database and is shown by a form for the user's selection; illustrated in FIG. 3(B) is an exemplar of the aforementioned form, wherein after a user selects an element, a material-selection form is displayed on a screen having columns including name of element, mode of packaging, property of element, material serial number of factory, specification of element, source of incoming materials, and unit price of element (the columns displayed can be set according to the user's requirements), wherein the column of unit price of element is provided so that the user can choose the most suited ones based on budget factors. Thereafter, a step S12 is implemented.

Figures 4A, 4B:
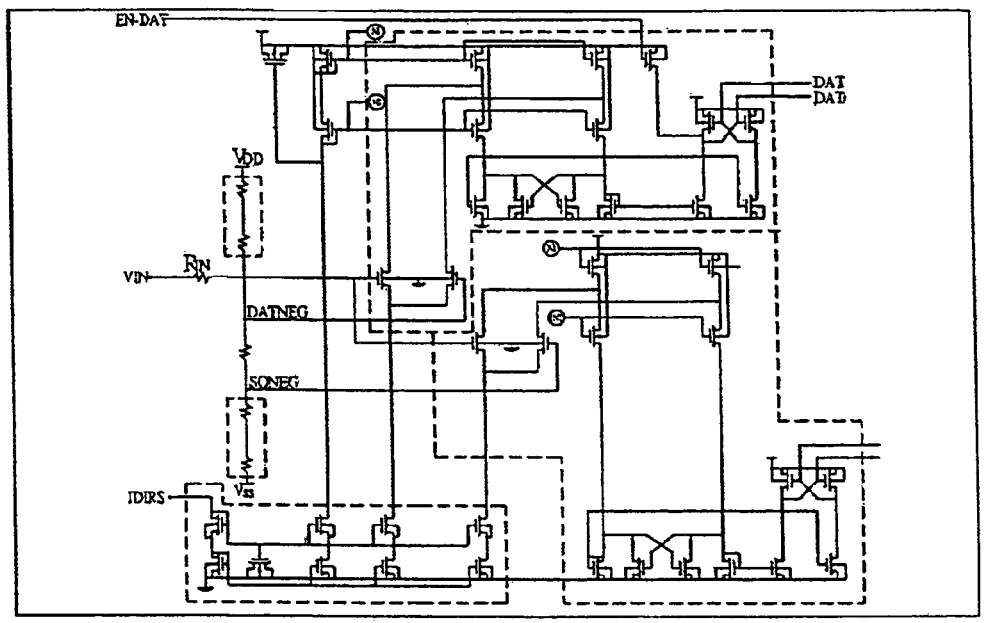
FIG. 4A is a schematic diagram showing a circuitry applied to the circuitry designing for the cost-optimization method of the invention.
FIG. 4B is a schematic diagram showing a form corresponds to the circuitry for the cost-optimization method of the invention.

In step S12, a total cost for the finished circuitry is calculated. This step is implemented using the aforementioned drawing software so that the user can evaluate and control the cost accordingly. FIG. 4(A) illustrates an exemplary circuitry in that after a user completes selection of all required elements, information relating to the circuitry is displayed on a screen and presented by means of a form via the drawing software; FIG. 4(B) illustrates an exemplary form, wherein the displayed information including columns of material serial number of factory, mode of packaging, quantity of element, unit price of element, cost of element, total quantity of element and total cost of element (the columns displayed can be set according to the user's requirements), wherein the column of unit price of element is provided for users' consideration based on budget factors. If the user considers the total cost of the chosen elements for a circuitry is too high, the user may reselect each composing element of lower unit prices, thereby achieving the objective of controlling an optimal cost in a circuitry designing process.

Figure 5:
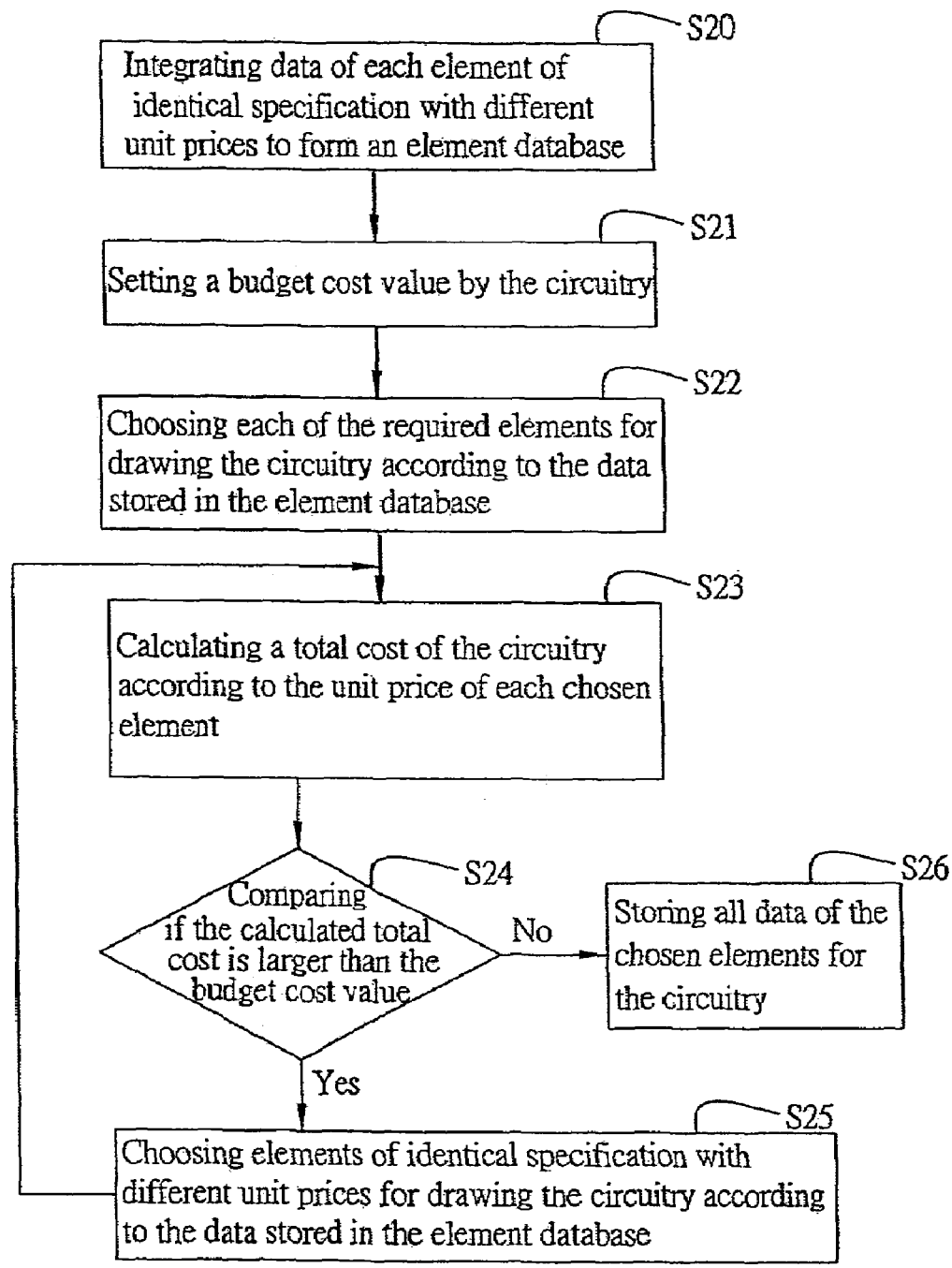
FIG. 5 is a schematic flow diagram showing the major steps for another preferred embodiment in proceeding the cost-optimization method of the invention.

FIG. 5 illustrates the major steps for proceeding another embodiment of the cost optimization method of the invention. Similarly, the steps in proceeding the cost optimization method of the invention is applied to a circuitry designing process for making electronic products, allowing a user in drawing a circuitry to choose elements of identical specification but different unit prices, thereby achieving the objective of the optimal cost.

First, a step S20 is implemented to integrate data of each electronic element of identical specification but different unit prices to form an element database. Similar to the step S10 shown in FIG. 2, this step is to first categorize each electronic element to sort out elements of identical specification but different unit prices so as to form an element database for proceeding the subsequent steps. Thereafter, step S21 is proceeded.

In step S21, the circuitry sets a budget cost value which is inputted into the drawing software by manual setting to serve as a cost control mechanism according to the budget considerations in circuitry designing for making electronic products. Thereafter, step S22 is proceeded.

In step S22, each of the required elements is chosen for drawing a circuitry according to the element database. This step is implemented in a way similar to the step S11 in FIG. 2, wherein a user chooses a most suitable element according to the data displayed from the database for completing the circuitry designing process. Thereafter, step S23 is proceeded.

In step S23, a total cost for making the circuitry is calculated based on the unit price of each of the elements chosen for the circuitry via the circuitry drawing software. Thereafter, step S24 is proceeded.

In step S24, the total cost of the circuitry is compared to the budget cost value, wherein the aforementioned drawing software compares the total cost with the aforementioned budget value to see if the total sum of each unit price of the chosen elements added up together is larger than the inputted budget value, and, if yes, step S25 is entered; or else, step S26 is proceeded.

In step S25, each of the elements of identical specification but different prices is chosen for drawing the circuitry according to the element database, wherein the total cost is deemed cost-ineffective to implement if the sum is larger than the inputted budget cost value, in such an instance, the drawing software displays a message on a screen to remind the user so that a new circuitry can be depicted by the user using elements of identical specification but at lower cost according to the information displayed from the element database, thereby completing the circuitry designing process. Thereafter, step S23 is returned to recalculate the total cost and make comparisons.

In step S26, the finished circuitry is stored if the total cost of the circuitry is smaller or equivalent to the inputted budget cost value, which means it is cost-effective to implement, the drawing software proceeds to store all data of chosen elements for the circuitry so as to proceed with subsequent production process and achieve the objective of an optimal cost accordingly.

Figure 6:
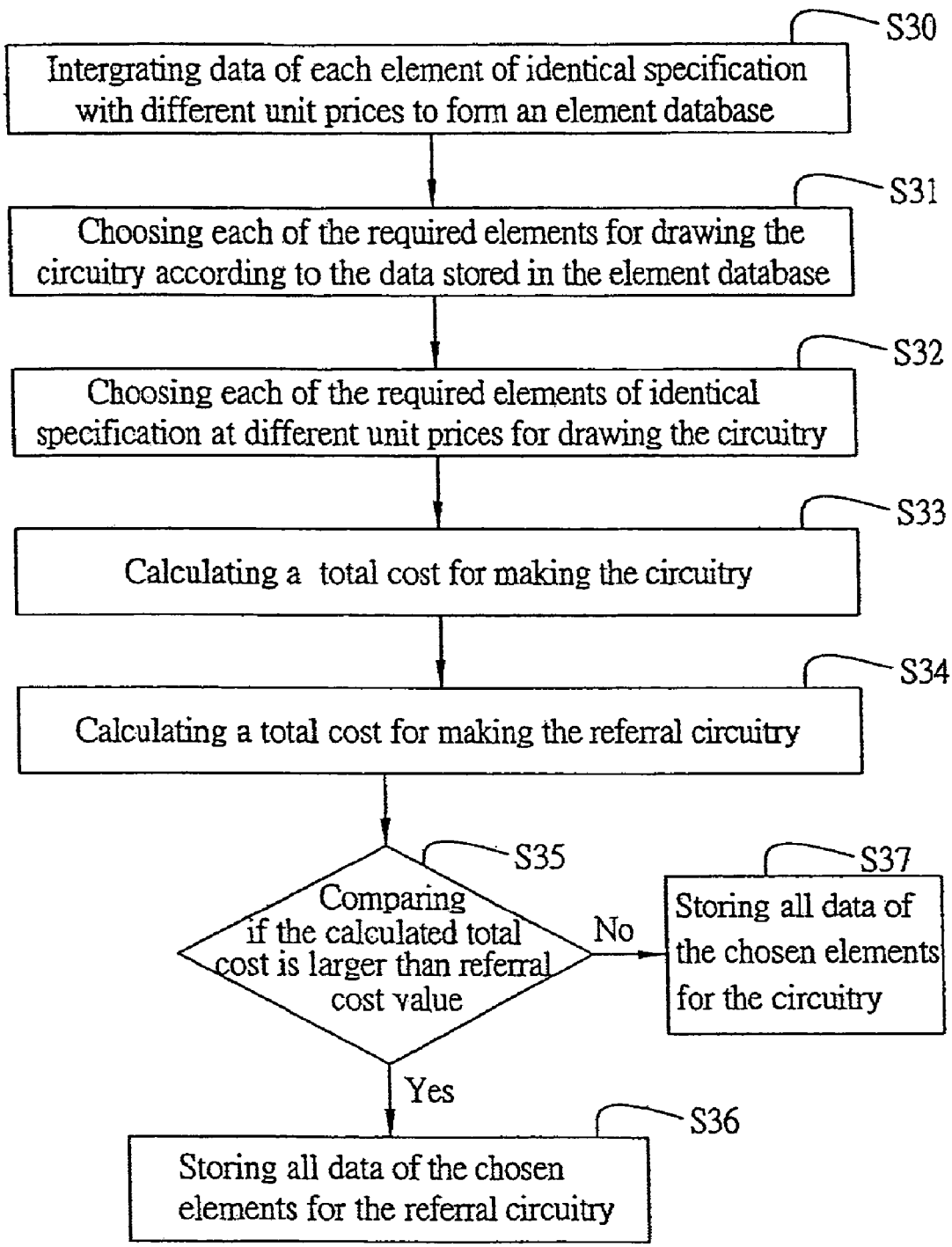
FIG. 6 is a schematic flow diagram showing the major steps for yet another preferred embodiment in proceeding the cost-optimization method of the invention.

FIG. 6 illustrates the major steps for proceeding another preferred embodiment of the cost optimization method of the invention. Similarly, the steps in proceeding the cost optimization method of the invention is applied to a circuitry designing process for making electronic products, allowing a user in drawing a circuitry to choose elements of identical specification but different unit prices, thereby achieving the objective of an optimal cost.

First, a step S30 is implemented to integrate data of each electronic element of identical specification at different unit prices to form an element database. Similar to the step S10 shown in FIG. 2 and the step S20 in FIG. 5, this step is first to categorize the electronic elements to sort out elements of identical specification but different unit prices so as to form an element database for proceeding the subsequent steps.

In step S31, each of the required elements is chosen for drawing the circuitry according to the element database. This step is implemented in a way similar to the step S11 in FIG. 2 and the step S22 of FIG. 5, wherein a user chooses a most suitable element according to the data displayed by the element database for completing the circuitry designing process. Thereafter, step S32 is proceeded.

In step S32, each electronic element of identical specification but different unit prices is chosen for drawing at least one referral circuitry. This step is implemented using the drawing software to choose elements of identical specification but different unit prices according to the element database and the circuitry drawn by the user. The specification of the elements used in the referral circuitry is the same as the foregoing circuitry but with different, i.e. lower unit prices. Therefore, since there is a plurality of elements with different unit prices, a plurality of referral circuitry is formed with different unit prices. Thereafter, step S33 is proceeded.

In step S33, a total cost for the circuitry is calculated based on the unit price of each of the elements chosen in the foregoing circuitry via the circuitry drawing software. Thereafter, step S34 is proceeded.

In step S34, a total cost for the referral circuitry is calculated based on the unit price of each of the elements chosen for the circuitry via the circuitry drawing software. If there is a plurality of referral circuitry, a plurality of the total cost for each of the referral circuitry will be generated. Thereafter, step S35 is proceeded.

In step S35, the total cost is compared to the total referral cost, wherein the aforementioned drawing software compares the total cost with the aforementioned referral total cost to see if the total sum of each unit price of the chosen elements added up together is larger than the foregoing referral total cost, and, if yes, step S36 is entered; or else, step S37 is proceeded.

In step S36, the referral circuitry is stored if the total cost is smaller or equivalent to the total referral value which is calculated using the drawing software according to the element database and the circuitry drawn by the user, which means it is cost-effective to implement, the drawing software then proceeds to store all data of chosen elements for the referral circuitry so as to proceed with subsequent production process, thereby achieving the objective of an optimal cost accordingly. In other words, the method is implemented using elements of identical specification with different prices, i.e. at lower cost, so as to complete circuitry designing and achieve an optimal cost.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for controlling an optimal cost, which can be applied to a circuitry designing process for making electronic products, allowing a user in drawing a circuitry to choose elements of identical specification but with different unit prices, the method comprising the steps of:

(1) integrating data of each of the elements of identical specification but with different unit prices to form an element database;
   (2) choosing each of the elements required for drawing the circuitry according to the data stored in the element database;
   (3) choosing each of the required elements of identical specification but with different unit prices for drawing at least one referral circuitry according to the element database and the circuitry drawn by the user;
   (4) calculating a total cost of the circuitry according to the unit price of each chosen element;
   (5) calculating a total cost of the referral circuitry according to the unit price of each chosen element;
   (6) comparing if the calculated total cost of the circuitry is larger than that of the referral circuitry, if yes, proceeds to step (7); or else, proceeds to step (8);
   (7) storing all data of the chosen elements for the referral circuitry; and
   (8) storing all data of the chosen elements for the circuitry.

2. The method for controlling an optimal cost as recited in claim 1, wherein the total cost is presented by means of a form.

3. The method for controlling an optimal cost as recited in claim 1, wherein the total cost is obtained via the calculation of a circuitry drawing software.

4. The method for controlling an optimal cost as recited in claim 1, wherein the total referral cost is presented by means of a form.

5. The method for controlling an optimal cost as recited in claim 1, wherein the total referral cost is obtained via the calculation of a circuitry drawing software.

6. The method for controlling an optimal cost as recited in claim 2, wherein the form at least comprises a column of total element quantity and a column of total cost.

7. The method for controlling an optimal cost as recited in claim 6, wherein the form further comprises columns of material serial number of factory, mode of packaging, quantity of element, unit price of element, and cost of element.

8. The method for controlling an optimal cost as recited in claim 5, wherein when drawing a circuitry, the circuitry drawing software links to the element database and is presented by means of a form for the user's selection.

9. The method for controlling an optimal cost as recited in claim 8, wherein the form at least comprises columns of name of element, specification of element, and the unit price of element.

10. The method for controlling an optimal cost as recited in claim 9, wherein the form further comprises a column of source of incoming material corresponding to unit price of element.

11. The method for controlling an optimal cost as recited in claim 9, wherein the form further comprises columns of mode of packaging, property of element, and element material serial number of factory.

12. The method for controlling an optimal cost as recited in claim 1, wherein each of the elements for the referral circuitry is chosen by the circuitry drawing software.

13. The method for controlling an optimal cost as recited in claim 12, wherein all data of the chosen elements for the referral circuitry is stored by the circuitry drawing software.

14. The method for controlling an optimal cost as recited in claim 5, wherein all data of the chosen elements for the circuitry is stored by the circuitry drawing software.

15. The method for controlling an optimal cost as recited in claim 5, wherein the comparison between the total cost value and the budget cost value is performed by the circuitry drawing software.

* * * * *